United States Patent [19]

Phelps et al.

[11] Patent Number: 5,062,608
[45] Date of Patent: Nov. 5, 1991

[54] VISOR MOUNT

[75] Inventors: Richard A. Phelps, Ferndale; Brian S. Lorence, Warren, both of Mich.

[73] Assignee: Chivas Products Limited, Sterling Heights, Mich.

[21] Appl. No.: 509,954

[22] Filed: Apr. 23, 1990

[51] Int. Cl.⁵ .................................................. A47F 5/00
[52] U.S. Cl. .................................. 248/289.1; 296/97.13
[58] Field of Search ............... 248/289.1, 222.3, 221.3, 248/222.1, 27.1; 296/97.12, 97.13; 411/349, 84, 85, 552, 553; 403/348, 349, 252, 353

[56] References Cited

U.S. PATENT DOCUMENTS

| | | | |
|---|---|---|---|
| 1,093,204 | 4/1914 | Pitts | 248/222.3 X |
| 3,415,472 | 12/1968 | Vodinh | 248/222.3 X |
| 3,478,992 | 11/1969 | Raschke | 248/222.3 X |
| 4,529,157 | 7/1985 | Suman | 248/289.1 |
| 4,569,552 | 2/1986 | Marks | 248/289.1 X |
| 4,818,013 | 4/1989 | Order | 296/97.13 |
| 4,840,525 | 6/1989 | Rebentisch | 403/348 X |
| 4,842,815 | 6/1989 | Cauquelin | 403/348 X |

FOREIGN PATENT DOCUMENTS 36796 9/1981 European Pat. Off. ......... 296/97.13

Primary Examiner—J. Franklin Foss
Attorney, Agent, or Firm—Townsend and Townsend

[57] ABSTRACT

An improved visor mount (16) removably fastens a visor to a panel (10) without the use of tools. The body has an outer portion (24), an inner portion (20), and an intermediate portion (23). The body includes a bore (26) to receive the visor handle (27). The inner portion includes a pair of wings (18, 19). The inner and intermediate portions are sized to pass through an oblong shaped first panel opening (14) in the panel; rotating the body to a fastened rotary orientation causes the wings to become misaligned with the panel opening to secure the body to the panel. A resiliently biased detent pin (17) is carried by one of the wings and automatically engages a second panel opening (15) when the body is at the fastened rotary orientation to automatically lock the visor mount in place.

22 Claims, 3 Drawing Sheets

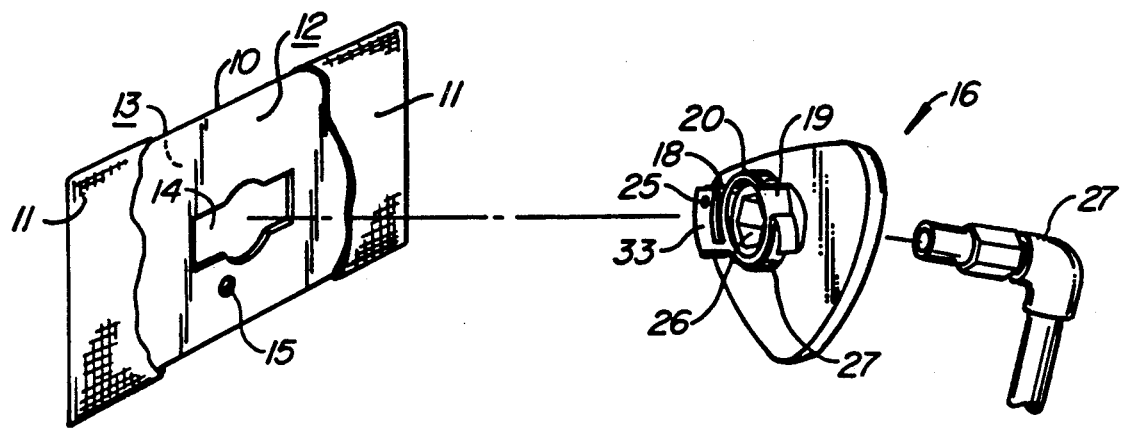
FIG._1A.
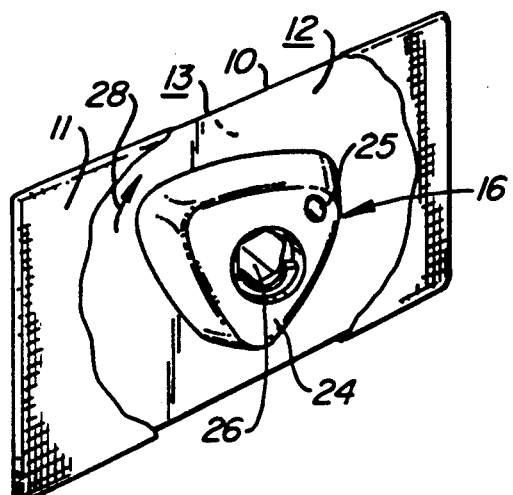
FIG._1B.
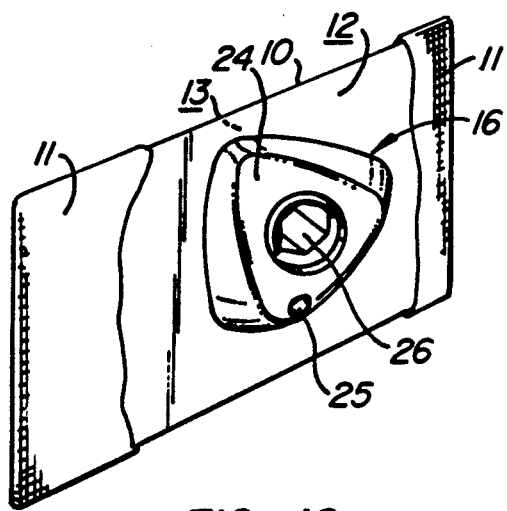
FIG._1C.

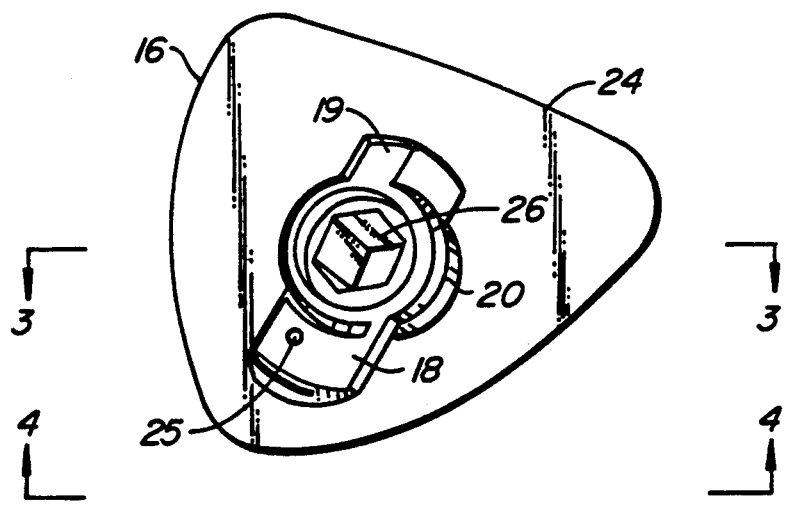
FIG._2.
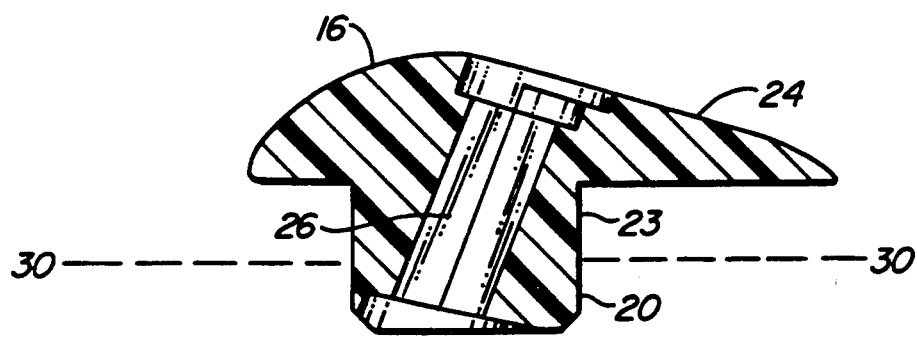
FIG._3.
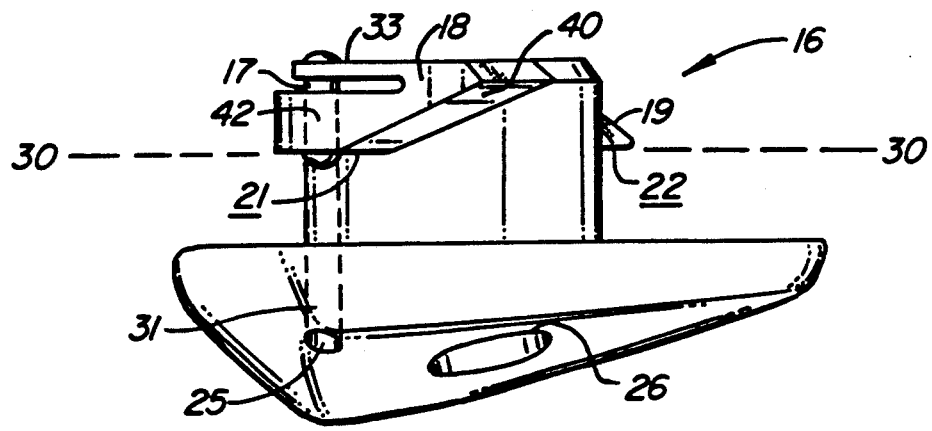
FIG._4.

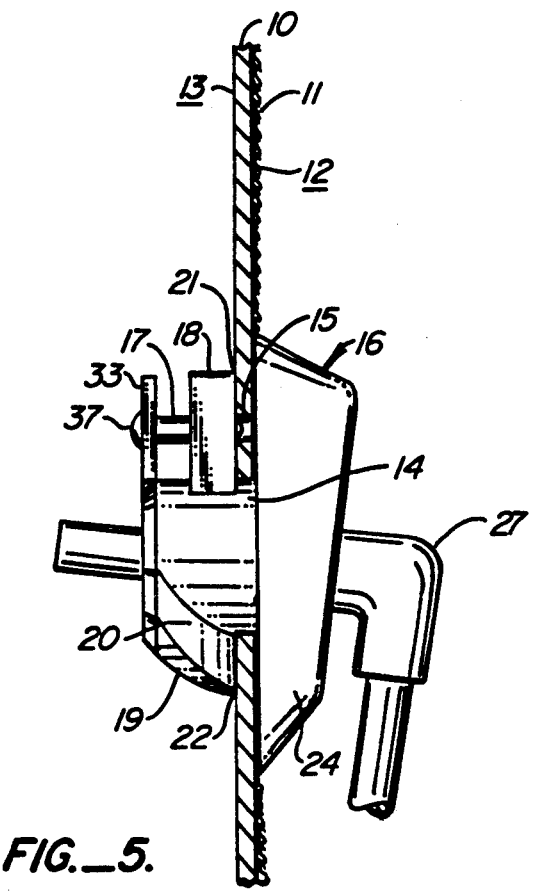
FIG._5.
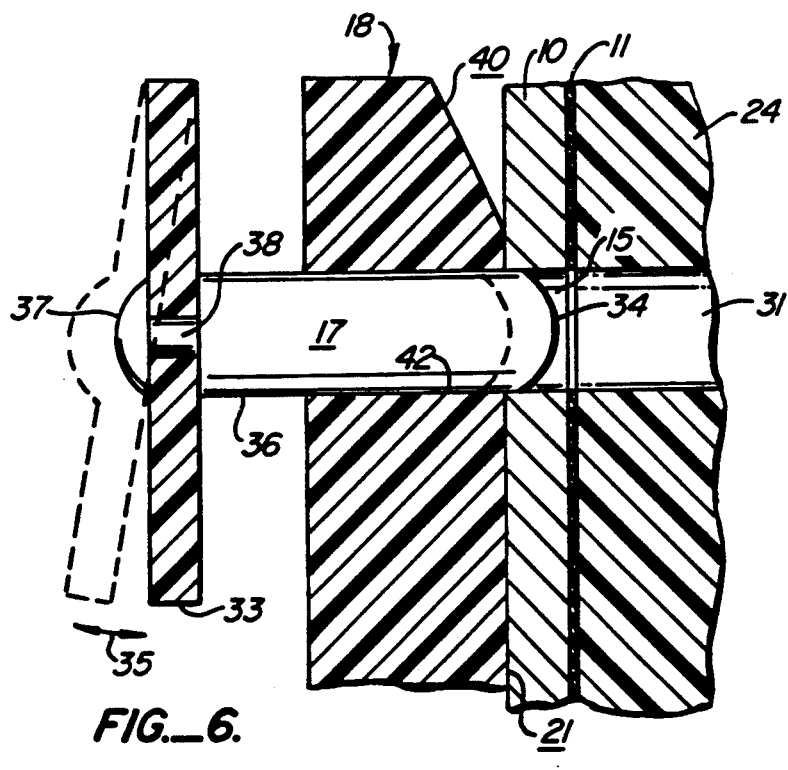
FIG._6.

VISOR MOUNT

BACKGROUND OF THE INVENTION

This invention lies in the field of vehicle visor mounting design as well as methods of installation of visor mounts in general.

Many, if not all, vehicles used for transportation by humans, especially while driving in the day time or when the sun is low in the sky, require a means of blocking the sun. Usually a sun visor is mounted somewhere between the driver of the vehicle and the windshield of the vehicle. When mounting such a visor, the visor must be mounted to the inside of the vehicle, usually in an area of the vehicle where it is desirous to have a fashionable fabric material lining the passenger compartment. This fabric material is usually installed before mounting the visor, so the visor must be mounted with the material already in place. To meet the demands of the highly automated factory where vehicles are assembled, visor mounts must be attached to the inside of the vehicles quickly.

Prior art design visor mounts are often screwed to the headliner. A common problem is that automatic screwdrivers sometimes slip from the screw head onto the headliner material, causing the headliner material to rip or tear. This requires the replacement of the torn material, a costly procedure.

SUMMARY OF THE INVENTION

A visor mount assembly has now been devised which combines ease of installation with the elimination of the chance of tearing, degrading or otherwise ruining the headliner during installation of the visor assembly. The visor mount of this invention comprises a body including an outer body portion, an inner body portion, and an intermediate body portion. The inner and intermediate body portions fit through an opening in the headliner and the panel which underlies the panel. Once inserted into the panel opening, the body of the visor mount assembly is rotated into a position where it can be fastened to the panel without the use of tools, i.e., in a "toolless" manner. This eliminates the need for screwdrivers or other tools to eliminate a source of damage to the headliner during installation of the visor mount.

The invention further lies in a method of installing the visor mount so as to avoid degradation of the headliner. The method comprises inserting the inner and intermediate body portions, rotating the visor mount to a final fastened orientation and toollessly securing the assembly to the supportive panel upon rotating it to its final position.

Further improvements, advantages, embodiments and aspects of the invention will become apparent from the description which follows.

BRIEF DESCRIPTION OF THE DRAWINGS

FIGS. 1A, 1B, and 1C are views showing the installation of visor mount made according to the present invention.

FIG. 2 is a back view of the visor mount of FIG. 1.

FIG. 3 is a sectional view taken along line 2—2 of FIG. 2.

FIG. 4 is a side view of the visor mount showing the various parts of the visor mount.

FIG. 5 is a side section view of the installed visor mount of FIG. 1C.

FIG. 6 is a side section view of the integral cantilever portion of one wing of the visor mount.

DETAILED DESCRIPTION OF THE PREFERRED EMBODIMENT

The visor mount of the invention can be specifically described in reference to the figures of the attached drawing. Referring the reader to FIGS. 1A–1C shown are three views of the installation of a visor mount 16 made according to the invention to a headliner assembly 8. Headliner assembly 8 includes a support panel 10 with a headliner material 11 covering its outside surface 12. (The headliner material 11 is shown partially cut away for the sake of clarity in FIGS. 1A–1C.) Panel 10 also has a inside surface 13, the significance of which will become apparent. Panel 10 is usually metal, although plastic, wood, and other materials are considered within the scope of the invention. The headliner material 11 is usually a resilient material which not only provides a good looking interior for the vehicle but also acts like a gasket to force the visor mounting assembly outward from panel 10, providing a tight fit. Panel 10 further has a first panel opening 14 and second panel opening 15. The first panel opening 14 receives portions of the visor mount 16, while the second opening 15 receives a steel securing pin 17, which secures visor mount 16 to panel 10, after the visor mount is rotated into position, as discussed herein.

Visor mount 16 further has, as shown in FIGS. 1A, 2, 4 and 5, a first wing 18 and second wing 19 extending radially from an inner body portion 20 of visor mount 16. The wings 18 and 19 have surfaces 21 and 22 (FIG. 4) which engage the panel inner surface 13. Visor mount 16 also has an intermediate body portion 23, an outer body portion 24, and preinstalled securing pin 17, which fits into wing hole 25. Mount 16 has a bore 26 which passes through body portions 20, 23, and 24 to receive a visor handle 27.

The intermediate body portion 23 resides within panel 10 in the installed configuration. The inner body portion 20 passes fully through the through panel opening 14. The visor mount then appears as in FIG. 1B. The entire visor mount is rotated, as shown by arrow 28, causing wing hole 25 to become lined up With panel opening 15. The preinstalled biased securing pin 17 then snaps into panel opening 15 and the visor mount is secured. It will be understood by those skilled in the art that panel opening 15 may penetrate the entire width of panel 10 or only penetrate part of the width of panel 10. Visor handle 27 is usually preinstalled to mount 16 in a conventional manner, such as by peening over as shown in FIG. 6.

FIG. 2 represents a back view of visor mount 16, that is, a view of the visor mount not seen once it has been installed. Particularly shown is bore 26 in inner body portion 20 with wings 18 and 19 attached radially to the inner body portion 20. Outer body portion 24 is also shown. It should be pointed out that outer body portion 24 and inner body portion 20 are not limited to the shapes shown. Other shapes are considered within the scope of the present invention. The only limit on the shape of the inner and intermediate body portions are that they must fit into panel opening 14 and allow visor mount 16 to be rotated into position where biased securing pin 17 (or other locking structure) locks the visor mount into position.

FIGS. 3 and 4 show more clearly certain features of the preferred embodiment of the invention. FIG. 3 more clearly shows how the bore 26 passes entirely through outer body portion 24, intermediate body portion 23 and inner body portion 20. Line 30 shows the approximate position of the inner surface of panel 10 (not shown) after visor mount 16 is installed. This line 30 separates inner and intermediate body portions 23 and 20, respectively. FIG. 4 shows how surfaces 21 and 22 of wings 18 and 19 engage the inside panel surface (again represented as 30). Camming surfaces 40 on wings 18, 19 help wings 18, 19 ride up onto surface 13 while portion 24 compresses material 11. FIG. 4 also shows biased securing pin or detent 17 in its extended position (after mount 16 has rotated), locking the visor mount to the panel. Also shown is extension 31 of wing hole 25. Extension 31 is used to permit pin 17 to be mounted within portion 42 of hole 25 formed in wing 18. Extension 31 also permits user access to pin 17 in the use position of FIG. 1C as discussed below.

FIG. 5 is a side section view of an installed visor mount of the present invention, locked into position by pin or detent 17. As can be clearly seen in FIG. 5, wing surfaces 21 and 22 of wings 18 and 19, respectively, engage the panel inner surface 13 in a tight fit fashion, due in part to the resilient headliner material 11 tending to push the entire visor mount to the right in FIG. 5. This force, along with the biasing pin 17, tightly holds the visor mount 16 to the panel 10.

The preferred method of preventing relative rotation between visor mount 16 and panel 10 is by providing a resiliently biased detent member 17, carried by wing 18, which engages second opening 15 in support panel 10 when visor mount 16 is at the final, fastened orientation. An integral cantilevered portion 33 of wing 18 biases detent member 17 towards opening 15.

As can be seen in FIG. 5, the axis of visor handle 27 and the axis of the pin 17 do not have to be parallel, and can be in any orientation the designer wishes and yet the visor mount can be held tightly to the panel.

FIG. 6 shows the shape of pin or detent 17 as it relates to the integral cantilevered portion 33 of wing 18. Cantilever portion 33 is shown in phantom to illustrate how portion 33 moves to bias pin 17, thereby moving head 34 of pin 17 into second opening 15 of panel 10. Pin 17 is shown having a large cylindrical portion 36 and a small cylindrical portion 38 which connects with a peened end 37. Cantilever portion 33 is captured between peened end 37 and large cylindrical portion 36 to secure pin 17 to cantilever portion 33. Other configurations will be known to those skilled in the art.

To remove visor mount 16, a thin instrument, such as a nail, is inserted into extension 31 of hole 25 to push against head 34 until head 34 is in the dashed line position of FIG. 6. Visor mount 16 is then rotated until wings 18, 19 become aligned with elongate opening 14. Visor mount 16 can then be removed from headliner assembly 8.

The foregoing description is offered primarily for purposes of illustration. It will readily be apparent to those skilled in the art that further modifications, variations and the like may be introduced in the materials, configurations, arrangements and shapes of the various elements of the structure without departing from the spirit and scope of the invention. For example, as discussed, opening 15 need not extend completely through panel 10 and still provide a sufficient depression for receipt of pin 17.

What is claimed is:

1. A toolless visor mount assembly, for use in mounting a visor to a panel of a vehicle, comprising:
   a body, including an outer body portion, an inner body portion, and an intermediate body portion;
   the vehicle panel having an outer surface, an inner surface, and a first opening formed therein, said first opening sized for receipt of the inner body portion and intermediate body portion when the body is at a first rotary orientation;
   means for removably securing the body to the panel when the body is moved from the first rotary orientation to a second rotary orientation, said means including a pin carried by the inner body portion; and
   the panel including a second opening adapted to receive said pin when the body is at the second rotary orientation.

2. The visor mount assembly of claim 1 wherein said inner body portion includes means for biasing the pin toward the second opening when the body is at the second rotary orientation.

3. The visor mount assembly of claim 2 wherein the biasing means include an integral, resilient cantilevered portion of the inner body portion, the cantilevered portion having a through hole adapted to hold the pin.

4. The visor mount assembly of claim 2 wherein the outer body portion has an access hole formed therein to permit the pin to be biased away from the second opening so the body can be rotated from the second rotary orientation to the first rotary orientation.

5. The visor mount assembly of claim 1 wherein the second opening is a through hole.

6. The visor mount assembly in accordance with claim 1 wherein the body has a bore adapted to receive a visor handle.

7. The visor mount assembly in accordance with claim 1 wherein the outer body portion substantially covers from view the opening in the panel when the body is in the second rotary orientation.

8. The visor mount assembly in accordance with claim 1 wherein the inner body portion further comprises a radially extending portion.

9. The visor mount assembly in accordance with claim 8 wherein the radially extending portion has a surface which engages said inner surface of said panel.

10. A toolless visor mount assembly, for use in mounting a visor to a panel of a vehicle, comprising:
    a body, including an outer body portion, an inner body portion, and an intermediate body portion, the inner body portion including a radially extending wing;
    the vehicle panel having an outer surface, an inner surface and an elongate first opening formed therein, said first opening sized for receipt of the inner body portion and intermediate body portion when the body is at a first rotary orientation;
    means for removably securing the body to the panel when the body is moved from the first rotary orientation to a second rotary orientation, at least a portion of said wing lying adjacent said inner surface of the panel when the body is at the second rotary orientation;
    the securing means including a pin carried by the inner body portion wing, a second opening formed in the panel, and means for biasing the pin toward the panel, the pin and second opening being positioned to be aligned when the body is in the second rotary orientation to permit the pin to engage the second opening and prevent relative rotary motion therebetween; and the biasing means including an integral, resilient cantilevered portion of the inner body portion, said cantilevered portion having a through hole adapted to hold the pin.

11. The assembly of claim 10 wherein the outer body portion has an access hole formed therein to permit the pin to be biased away from the second opening so the body can be rotated from the second rotary orientation towards the first rotary orientation.

12. A toolless visor mount assembly, for use in removably fastening a visor to a panel, the panel having an opening comprising:

an integral body comprising an outer component, an inner component, and an intermediate component between the outer and inner components, said body having a bore to receive a visor handle, said inner and intermediate components sized to fit through an opening in the panel; and at least one means for removably securing the body to the panel without the use of a tool, said means comprising a hole in the panel and a biased pin carried by in the inner compartment, said pin insertable into the hole in the panel as the body is rotated from a first position to a final secured position in the panel.

13. A visor mount assembly in accordance with claim 12 wherein the inner component of the body has an opening which slidably houses said biased pin to secure the body to the panel after the inner and intermediate components are inserted through the opening in the panel and the body rotated in a plane substantially parallel to the panel from an insertion position to a fastened position, the biased pin engaging the hole in the panel when the body is in the fastened position.

14. A visor mount assembly in accordance with claim 13 wherein said panel further comprises a front surface and a back surface, and the inner component slidably engages said back surface and said outer component slidably engages said front surface when installing the visor mount assembly.

15. A toolless visor mount assembly, adaptable to detachably fasten a visor to a support panel by toolless action, comprising;

first and second male members, with a support panel having a first opening and a second opening, said first opening adapted to receive the first male member, with said support panel further having back surface and a front surface, and with said second opening adapted to receive the second male member after said first male member is inserted into said first opening and rotated therein, thereby removably securing said first male member to said support panel, said first male member having an opening through its central axis and an outer body portion which does not pass through said first opening; and said first male member further having a pair of oppositely opposed wings extending radially from its outside surface and which pass through said first opening, one of said wings having a through hole which carries said second male member.

16. A toolless visor mount assembly in accordance with claim 15 wherein said front surface of said support member has a resilient layer of material disposed between said front surface and said outer body portion which serves to force said wings against said back surface of said support panel.

17. A toolless visor mount assembly in accordance with claim 15 wherein said first male member has an axially extending internal passage therethrough adapted to receive a support arm for detachably fastening said visor member to said support panel.

18. A toolless method of installing a visor mount in a support panel comprising:

selecting a visor mount comprising an inner body portion, an outer body portion, and an intermediate body portion, said inner body portion having at least one radially extending wing;

passing the inner body portion and the intermediate body portion of the visor mount through a first opening in the support panel to an insertion orientation so the outer body portion is opposite a first surface of the support panel;

rotating the visor mount from the insertion orientation to a final fastened orientation, said at least one wing being opposite a second surface of the support panel when in the final, fastened orientation so to prevent axial removal of the visor mount from the first opening; and preventing relative rotation between the visor mount and the panel by providing a resiliently biased detent member, carried by the wing, which engages a second opening in the support panel when the visor mount is at the final, fastened orientation.

19. The method of claim 18 wherein the selecting step is carried out with a visor mount having first and second wings.

20. The method of claim 18 wherein the selecting step includes selecting a visor mount with a wing having a cam surface which engages the second surface of the support panel.

21. The method of claim 18 wherein the preventing step is carried out using an integral cantilevered portion of the wing to bias the detent member, the cantilevered portion including a through hole for said detent member.

22. The method of claim 18 further comprising the steps of:

dislodging the detent member from the second opening;

rotating the visor mount from the final, fastened orientation to the insertion orientation; and removing the inner and intermediate body portions from the first opening.

* * * * *